(12) United States Patent
Alsalem et al.

(10) Patent No.: US 12,644,823 B2
(45) Date of Patent: Jun. 2, 2026

(54) TOP-OF-LINE CORROSION SIMULATOR

(71) Applicant: SAUDI ARABIAN OIL COMPANY, Dhahran (SA)

(72) Inventors: Mustafa Mohammed Alsalem, Ar Rawdah (SA); Hassan Ali Al-Ajwad, Dhahran (SA); Ali A. Jabran, Dammam (SA); Turki Abdullah Al-Khaldi, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 286 days.

(21) Appl. No.: 18/528,543

(22) Filed: Dec. 4, 2023

(65) Prior Publication Data

US 2025/0180466 A1 Jun. 5, 2025

(51) Int. Cl.
G01N 17/00 (2006.01)
G01N 17/02 (2006.01)
G01N 17/04 (2006.01)

(52) U.S. Cl.
CPC ........... G01N 17/002 (2013.01); G01N 17/02 (2013.01); G01N 17/04 (2013.01)

(58) Field of Classification Search
CPC ....... G01N 17/002; G01N 17/02; G01N 17/04
USPC ......... 73/37, 86, 865.6, 866; 374/45, 46, 51, 374/57; 324/438, 693, 700, 71.1; 205/775.5, 777; 204/404
See application file for complete search history.

(56) References Cited

U.S. PATENT DOCUMENTS 8,261,601 B2 9/2012 Stolle et al.
8,889,598 B2 11/2014 Gillet
(Continued)

FOREIGN PATENT DOCUMENTS

CN 102004074 B 7/2014
CN 107121376 B 8/2019
CN 210514049 U 5/2020
(Continued)

OTHER PUBLICATIONS

Silakorn et al.; Top-of-line corrosion via physics-guided machine learning: A methodology integrating field data with theoretical models; Journal of Petroleum Science and Engineering 215 (2022) 110558; 14 pages.
(Continued)

*Primary Examiner* — Robert R Raevis
(74) *Attorney, Agent, or Firm* — Leason Ellis LLP

(57) ABSTRACT

A system for simulating top-of-line corrosion is provided. The system includes an autoclave chamber having a liquid phase and a gas phase that simulate the conditions of a wet gas pipeline, where the gas phase comprises $H_2S$ and $CO_2$. The system also includes an arc-shaped substrate having a curvature that mimics the size and shape of the top of a pipeline of interest. The substrate is held via a holder that applies variable stress to ends of the substrate. The system also includes a cooler that cools the substrate, a heating element the heat a lower portion of the autoclave chamber, a collector that collects condensate from the substrate, and a meter that measures a pH of the collected condensate. The system can further include an electrical resistance probe and electrochemical probe that measure a corrosion rate on the surface of the respective probes.

20 Claims, 1 Drawing Sheet

(56) References Cited

U.S. PATENT DOCUMENTS

| | | |
|---|---|---|
| 11,467,083 B2 | 10/2022 | Al-Khaldi et al. |
| 2022/0381674 A1 | 12/2022 | Al-Khaldi et al. |

FOREIGN PATENT DOCUMENTS

| | | | | |
|---|---|---|---|---|
| CN | 210514050 U | | 5/2020 | |
| CN | 114235675 A | * | 3/2022 | ............. G01N 17/02 |
| RU | 180595 U1 | * | 6/2018 | ............. G01N 17/02 |

OTHER PUBLICATIONS

Rafefi; Development and evaluation of thin film electrical resistance sensors for monitoring CO2 top of the line corrosion; Sensors & Actuators: B. Chemical 346 (2021) 130492; 14 pages.

Askari; Development of a novel setup for in-situ electrochemical assessment of top of the line corrosion (TLC) and its smart inhibition under simulated conditions; Process Safety and Environmental Protection 160 (2022) 887-899.

Li, at al.; Corrosion of X80 steel in a wet gas pipeline under the top-of-the-line environment Journal of Electroanalytical Chemistry 912 (2022) 116269; 5 pages.

Islam et al.; Development of an electrochemical method to study top-of-the-line corrosion; Nace Corrosion 2017, Paper No. 9106; 13 pages.

Singer et al.; Review of Volatile Corrosion Inhibitors Evaluation Methods and Development of Testing Protocols; Nace Corrosion 2019, Paper No. 13303; 15 pages.

Lu et al.; Diffusion layer model for condensation of vapor with the presence of noncondensable gas under natural convective conensation; Progress in Nuclear Energy 118 (2020) 0103078; 15 pages.

Dehbi; Correcting to tube curvature effects on condensation in the presence of a noncondensable gas in turbulet free convection; International Journal of Heat and Mass Transer 164 (2021) 120594; 13 pages.

A. Dehbi; Correcting for tube curvature effects on condensation in the presence of a noncondensable gas in laminar regimes; International Journal of Heat and Mass Transfer 151 (2020) 119384; 9 pages.

* cited by examiner

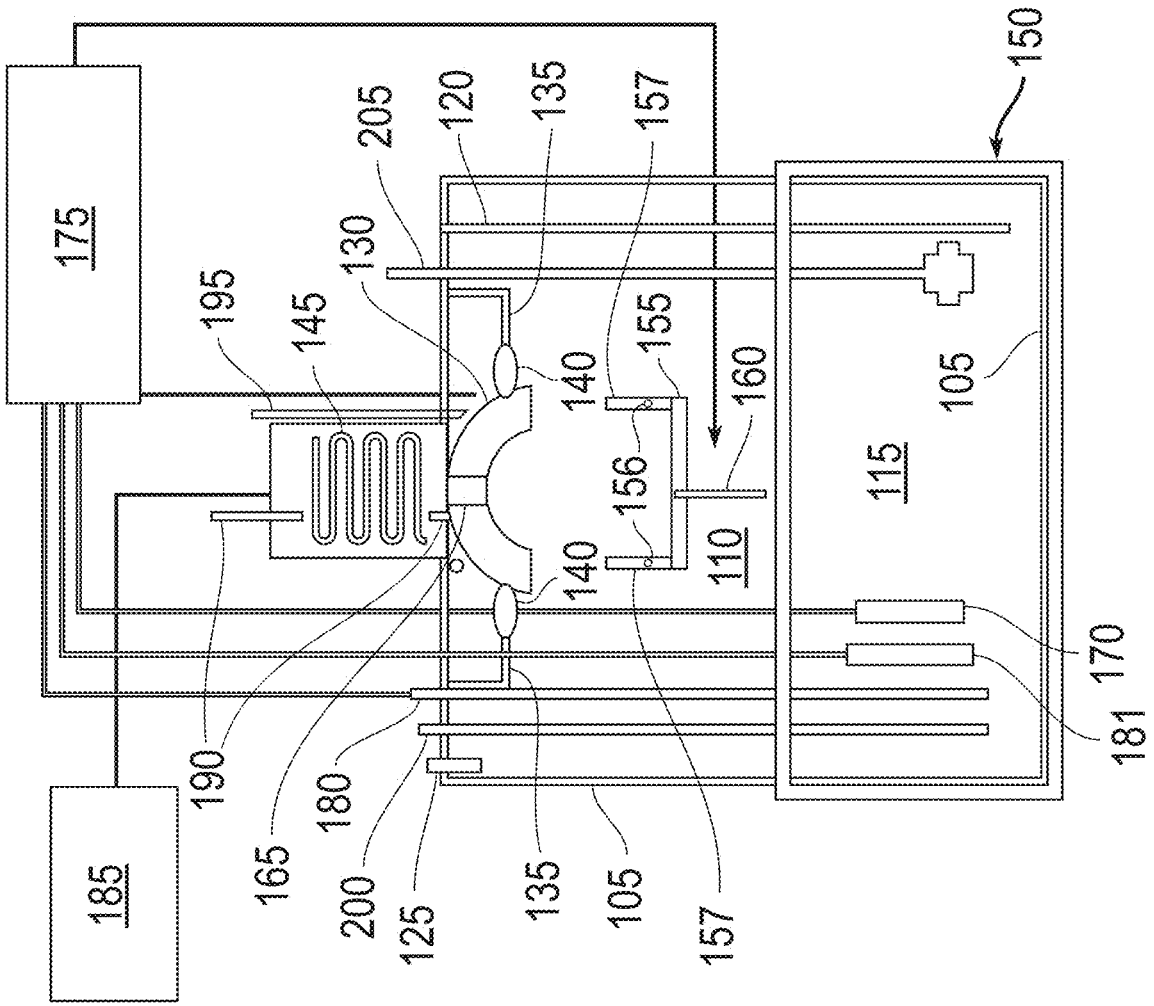

TOP-OF-LINE CORROSION SIMULATOR

TECHNICAL FIELD

The present disclosure relates to a corrosion simulator, and in particular a simulator for measuring corrosion at the top of a pipeline.

BACKGROUND

Top-of-the-line corrosion (or top-of-line corrosion or "TLC") is an emerging challenge in wet gas transport pipelines. Wet gas pipelines generally refer to pipelines that transport wet natural gas that generally include a mixture of hydrocarbons (e.g., methane, ethane, butane, pentane, propane, and other more complex hydrocarbons), as well as other gas that can include carbon dioxide, hydrogen sulfide, water vapor, and nitrogen.

As the name implies, TLC occurs in the upper part of the pipelines (inner wall). Specifically, droplets from the wet natural gas that comprise hydrogen sulfide, carbon dioxide, and acetic acid, for example, can develop on the top portion of the pipeline in the form of condensate, and the acidity of these fluids leads to corrosion. The corrosive environment provided by these fluids can result in accelerated corrosion rates at the top of the line, which can lead to premature failure of a portion of the pipeline. The location of the corrosion at the top of the inner wall of the pipeline makes measuring the severity of such corrosion technically challenging. For example, the presence of a thin layer of electrolyte due to water condensation (driven by temperature variations) renders most electrochemical measurements, such as Linear Polarization Resistance, impractical.

In regard to the above, the present disclosure is directed to provide a technical solution for measuring and studying pipeline corrosion, including top-of-the-line corrosion.

SUMMARY

In a first aspect, a system for simulating top-of-line corrosion is provided. The system comprises an autoclave chamber comprising a liquid phase and a gas phase that simulate the conditions of a wet gas pipeline, wherein the gas phase comprises $H_2S$ and $CO_2$. The system also comprises a sample substrate having a curvature that mimics the size and shape of the top of a pipeline of interest, wherein the sample substrate is arc-shaped and wherein the sample substrate is located in the gas phase of the autoclave chamber. The system also includes a sample holder configured to apply variable stress to ends of the sample substrate and a cooler located on an upper portion of the autoclave, wherein the cooler is configured to cool the sample substrate. The system also includes a heating element operatively connected to a lower portion of the autoclave chamber and configured to heat the liquid phase, and a condensation collector located beneath at least a portion of the sample substrate within the autoclave chamber and configured to collect condensate from the sample substrate. The system further includes a pH meter operatively connected to the condensation collector and configured to measure a pH of the collected condensate, an electrical resistance probe connected to the sample substrate, and an electrochemical probe in contact with the liquid phase, wherein the electrical resistance and electrochemical probes are configured to measure a corrosion rate on the surface of the respective probes.

In another aspect, the system further comprises a counter electrode, a reference electrode, and a potentiostat operatively connected to the electrochemical probe and the counter electrode.

In another aspect, the system further comprises a data logger operatively connected to the electrical resistance probe.

In another aspect, the condensation collector comprises a wall having at least one side perforation configured to control the level of condensate in the condensation collector.

In another aspect, variable stress is applied by the sample holder via at least one screw applied to each end of the sample substrate. In a further aspect, the variable stress applied is up to approximately 500 MPa.

In another aspect, the system further comprises a first thermocouple configured to measure a temperature of the sample substrate, a second thermocouple configured to measure a temperature of the gas phase, and a third thermocouple configured to measure a temperature of the liquid phase.

In another aspect, the system simultaneously simulates top-of-line corrosion and bottom-of-line corrosion.

In another aspect, the system further comprises a gas inlet and gas outlet, wherein the gas inlet and gas outlet are configured to transport acid gases in and out of the system, respectively.

In another aspect, the system further comprises a solution stirrer.

In another aspect, the heating element is a heating jacket surrounding the lower portion of the autoclave chamber. In another aspect, the heating element is configured to heat the lower portion of the autoclave chamber at a temperature in the range of approximately 0° C. to approximately 200° C.

In another aspect, the cooler maintains a temperature of the sample substrate in a range of approximately –10° C. to approximately 50° C.

In another aspect, the autoclave chamber is operated at a pressure of up to approximately 5000 psi and at a temperature in the range of approximately 0° C.-200° C.

In another aspect, the condensation collector is further configured to measure the water condensation rate.

In a second aspect, a s stem for simulating top-of-line corrosion is provided that includes an autoclave chamber having a liquid phase and a gas phase that simulate the conditions of a wet gas pipeline; an arc-shaped sample substrate having a curvature that mimics the size and shape of the top of a pipeline of interest; and a sample holder configured to apply variable stress to ends of the sample substrate. The system also includes a cooler located on an upper portion of the autoclave and configured to cool the sample substrate; a heating element operatively connected to a lower portion of the autoclave chamber and configured to heat the liquid phase; and a condensation collector located beneath at least a portion of the sample substrate within the autoclave chamber and configured to collect condensate from the sample substrate. The system also includes an electrical resistance probe connected to the sample substrate, and an electrochemical probe in contact with the liquid phase, where the electrical resistance and electrochemical probes are configured to measure a corrosion rate on the surface of the respective probes.

In another aspect, the system further comprises a counter electrode, a reference electrode, a potentiostat operatively connected to the electrochemical probe and the counter electrode, and a data logger operatively connected to the electrical resistance probe.

In another aspect, the heating element is configured to heat the lower portion of the autoclave chamber at a temperature in the range of approximately 0° C. to approximately 200° C., and the cooler maintains a temperature of the sample substrate in a range of approximately −10° C. to approximately 50° C.

In another aspect, the variable stress applied is up to approximately 500 MPa.

In another aspect, the system further includes a gas inlet and gas outlet, wherein the gas inlet and gas outlet are configured to transport acid gases in and out of the system, respectively.

Any combinations of the various embodiments and implementations disclosed herein can be used. These and other aspects and features can be appreciated from the following description of certain embodiments and the accompanying drawings and claims.

BRIEF DESCRIPTION OF THE DRAWINGS

The processes of the present disclosure will be described in more detail below and with reference to the attached drawing.

FIG. 1 displays a diagram of an exemplary top-of-line corrosion simulator in accordance with one or more embodiments.

DETAILED DESCRIPTION OF CERTAIN EMBODIMENTS

Disclosed herein is a top-of-line corrosion simulator and associated methods for simulating corrosion. In accordance with one or more embodiments, the present simulator system can include an autoclave chamber that comprises a liquid phase and a gas phase, where the gas phase comprises $H_2S$ and $CO_2$. The liquid phase and the gas phase in the autoclave simulate the conditions of a wet gas pipeline. Specifically, the autoclave chamber can be a high pressure and high temperature reactor capable of safely holding acid gases, particularly hydrogen sulfide ($H_2S$) gas. It can simultaneously simulate both top-of-line and bottom-of-line conditions in one experiment. It is also capable of measuring condensation rate and specimen surface temperature in a well-controlled environment. The present system can perform corrosion measurements through weight loss measurements as well as electric resistance technique and electrochemical measurements (e.g. linear polarization resistance in liquid phase). Additionally, the present system can assess environment assisted cracking such as Stress Corrosion Cracking (SSC) or sulfide stress cracking (SSC).

The present simulator system includes a sample substrate, which can be located in the gas phase of the autoclave chamber. The sample substrate can have a curved shape that mimics the size and shape of the top of a pipeline. Thus, in certain embodiments, the sample substrate can be arc-shaped. The simulator system can also include a sample holder configured to apply variable stress to ends of the sample substrate, as well as a cooler configured to cool the sample substrate and control the temperature of the sample substrate and the surrounding area.

The system can also include a heating element for heating the liquid phase in a lower portion of the autoclave, and a condensation collector that is located beneath a portion of the sample substrate and configured to collect condensate from the sample substrate. The system can also include a pH meter for measuring a pH of the collected condensate, as well as an electrical resistance probe and an electrochemical probe in contact with the liquid phase of the autoclave. The probes measure a corrosion rate on the surface of the respective probes.

With the system of the present application, a wide range of corrosion attacks in wet gas pipelines can be simulated, observed, and measured. In one or more embodiments, the system has the ability to simultaneously simulate both bottom-of-line and top-of-line corrosion. Additionally, corrosion measurements—especially measurements simulating the top of the line—can be conducted in the presence of a variable load applied to the corroding sample substrate to help investigate the effect of environmentally-assisted cracking. The present system also has the capability of simulating actual pipelines conditions to allow accurate prediction and assessment of materials and chemicals performance prior to application in the field.

These and other aspects of the present systems and methods are described in further detail below. Further, as used in the present application, the term "approximately" when used in conjunction with a numerical value refers to any number within about 5, 3 or 1% of the referenced numerical value, including the referenced numerical value.

FIG. 1 shows a diagram of an exemplary top-of-line corrosion simulator system 100 in accordance with one or more embodiments. With reference now to FIG. 1, the system 100 includes an autoclave chamber 105. In one or more embodiments, the autoclave chamber 105 can be a high-pressure, high-temperature autoclave chamber. In one or more embodiments, the autoclave chamber 105 is operated at a pressure of up to approximately 5000 psi (approximately 345 bar) and at a temperature in the range of approximately 0° C.-200° C. The autoclave chamber 105 includes a gas phase 110 and a liquid phase 115. The gas phase 110 can enter the chamber 105 via gas inlet 120 and can exit the chamber 105 via gas outlet 125. The gas phase 110 can include hydrogen sulfide ($H_2S$) and carbon dioxide ($CO_2$). The gas phase can further include a mixture of hydrocarbons, for example, a combination of one or more of methane, ethane, butane, pentane, propane, and/or other more complex hydrocarbons, as well water vapor and/or nitrogen, or gases comprising acidic components (e.g., acetic acid). The liquid phase 115 can be comprised of water as well as other liquids from reservoirs or a mixture that mimics the liquid of reservoirs. For instance, in one or more embodiments, the liquid phase 115 can include high salt content water, and hydrocarbons (e.g., condensate).

The autoclave chamber 105 further includes a sample substrate 130, which can be located in the gas phase portion of the autoclave chamber 105. In at least one embodiment, the sample substrate 130 can be at least partially located in the liquid phase portion of the autoclave chamber 105. The sample substrate 130 has a curvature that models the size and the shape of the top portion of a pipeline of interest. For example, in one or more embodiments, the substrate 130 can be arc-shaped. The sample substrate can be made of one or more types of steels. For example, the sample substrate can comprise one or more carbon steels. In at least one embodiment, the sample substrate can comprise other alloy types, such as stainless steels. The size of the sample substrate can vary depending on its position in the liquid or gas phase. For instance, in one or more embodiments when the sample substrate is located in the gas phase, the substrate can have a size of approximately 19 mm outer diameter (OD). In one or more exemplary embodiments when the sample substrate is at least partially located in the liquid phase, the sample substrate can have a size of approximately 25.4 mm×76.2 mm×1.59 mm. The curvature of the substrate improves simulation of corrosive field conditions relevant to top-of-the-line corrosion. Specifically, as top-of-the-line corrosion takes place in the upper curved portion of pipelines transporting wet sour gas, the sample substrate 130 of the present system mimics this upper curved shape of the pipeline. In one or more embodiments, the curvature of the sample substrate 130 (corroding substrate) integrates aspects such as controlled water condensation and applied variable stress into the simulated environment. This allows the present system 100 to better to simulate stress corrosion cracking (SCC), for example. Water condensation is highly influenced by the curvature of surface at which it occurs due to changes in heat transfer and gravitational force. Droplet initiation and growth as well as surface adsorption over the curvature shape are different than that on a flat surface. This has a clear influence on TLC in addition to other forms of corrosion such as sulfide stress cracking (SSC) or stress corrosion cracking (SCC).

The sample substrate 130 can be held in place in the chamber 105 via a sample holder 135. The sample holder 135 is configured to apply variable stress (mechanical stress) to the ends of the sample substrate. Specifically, to simulate SCC in the present system 100, the corroding sample substrate 130 can be placed under controlled stress of variable magnitudes to evaluate the effect of hydrogen sulfide ($H_2S$) gas presence not only on corrosion resistance, but also on mechanical properties (e.g., crack development and propagation) of the corroding substrate. In one or more embodiments, the amount of stress applied to the sample substrate via the sample holder 135 can be up to approximately 500 MPa. In one or more embodiments, the well-defined stress can be applied via at least one screw 140 attached to each of the sides of the curved corroding substrate 130.

With continued reference to FIG. 1, the system 100 further includes a cooler 145 located at an upper portion of the autoclave chamber 105. In one or more embodiments, the cooler 145 is located above the sample substrate 130. The cooler 145 is configured to cool to the sample substrate and control the temperature of the sample substrate and the surrounding area. In one or more embodiments, a liquid coolant is used in the cooler 145 for controlling the temperature of the sample substrate. In one or more embodiments, the cooler maintains the temperature of the substrate in a range of approximately −10° C. to approximately 50° C. The system 100 can further include a heating element 150 operatively connected to a lower portion of the autoclave chamber 105 and configured to heat and control the temperature of the liquid phase 115. In at least one embodiment, the heating element 150 is a heating jacket that surrounds a lower portion of the autoclave chamber 105, as exemplified in FIG. 1. The heating jacket is configured to heat the lower portion of the autoclave chamber 105, thereby heating the liquid phase 115. In one or more embodiments, the heating element 150 is configured to heat the lower portion of the autoclave chamber 105 at a temperature in the range of approximately 0° C. to approximately 200° C. In at least one embodiment, the heating element 150 can be a heating coil or other heating element that can be located within the autoclave chamber 105 or surround the autoclave chamber 105.

The temperature difference caused by the cooler 145 at the top portion of the chamber 105 and the heating element 150 at the bottom portion of the chamber 105 helps to cause condensate to form on the surface of the sample substrate 130. The condensate can comprise water vapor and the compounds from the gas delivered to the chamber 105, for example, $H_2S$, $CO_2$, and acetic acid. The acidity of these fluids leads to corrosion on the sample substrate 130, thereby simulating the effects of wet natural gas on the pipeline.

The system 100 can further include a condensation collector 155 that is located beneath at least a portion of the sample substrate 130 in the chamber 105. The condensation collector 155 is configured to collect condensate that drips down from the surface the sample substrate 130. The condensation collector 155 is configured to measure the water condensation rate (e.g., via a sensor) and serves as a container to enable pH measurements of the collected, condensed water. The system can further include a pH meter 160 operative connected to the condensation collector 155, where the pH meter 160 measures the pH of the collected condensate and the pH meter 160 is configured to withstand high pressures and high temperatures. In at least one embodiment, the condensation collector 155 can include one or more side perforations 156 in a side wall 157 of the collector 155 configured to allow for the flow of a portion of the condensate out of the collector 155 to control the level of condensate in the collector 155.

The system 100 further includes at least one electrical resistance probe 165 and at least one electrochemical probe 170. In one or more embodiments, the probes 165 and 170 are in the form of electrodes. The electrical resistance (ER) probe 165 is located on a part of the curved portion of the sample substrate 130, and is operatively connected to a data logger (data logger 185) and the cooler 145. The surface of the electrochemical probe 170 is in contact with the liquid phase 115. As exemplified in FIG. 1, in one or more embodiments, a bottom portion of the electrochemical probe 170 is submerged in the liquid phase 115. The ER probe 165 and the electrochemical probe 170 are configured to measure a corrosion rate on the surface of the respective probes, thereby providing data regarding the corrosive effects of the simulated environment. Specifically, in one or more embodiments, the resistance measurement of the ER probe 165 can enable the measurement of the current moving through the liquid phase. The ER probe 165 also allows for the metal weight loss of the ER probe (reduction of thickness of the metal on the probe) to be measured, which is correlated with a general corrosion rate of the simulated environment. Specifically, an increase in electrical resistance is proportional to the accumulated corrosion of the ER probe over the time the ER probe is exposed to the liquid phase In contrast, the electrochemical probe 170 measures changes in current in response to changes in potential of the electrochemical probe 170, or the galvanic current of a metal in a function of time. Electrochemical analyses of the frequencies of the signals distinguish between a particular uniform corrosion and localized corrosion. Thus, the electrochemical probe 170 helps to measure localized corrosion rates on the surface of the electrochemical probe 170.

The electrochemical probe 170 can be operatively connected to a potentiostat 175. The potentiostat 175 can be operatively connected to a counter electrode 180 and a reference electrode 181. The potentiostat 175 measures the current flow between the electrode of the electrochemical probe 170 and the counter electrode 180.

In one or more embodiments, the system 100 further includes a data logger 185. The data logger 185 can comprise a microprocessor and can be configured to record data over time. For example, in at least one embodiment, the data logger 185 is operatively connected to the ER probe 165 such that the data logger 185 can record data from the ER probe 165 over time.

The system can further include one or more thermocouples. As exemplified in FIG. 1, in one or more embodiments, the system 100 can include a first thermocouple 190 operatively connected to the sample substrate 130 and configured to measure the temperature of the sample substrate 130. The system 100 can also include a second thermocouple 195 in contact with the gas phase 110 of the autoclave chamber 105 and configured to measure a temperature in the gas phase of the chamber 105. The system 100 can further include a third thermocouple 200 in contact with the liquid phase 115 of the autoclave chamber 105 and configured to measure a temperature of the liquid phase 115. The system 100 can further include a solution stirrer 205, which can be configured to mix the liquid phase 115 in the chamber 105. In at least one embodiment, the solution stirrer 205 is a magnetic stirrer.

In one or more embodiments, the system 100 is configured to simulate both top-of-line corrosion and bottom-of-line corrosion. This is enabled by featuring dedicated corrosion measuring electrodes in both liquid and gas phase relying on different techniques (electric resistance and electrochemical). The system 100 also assists in investigating the potential for environmental-assisted cracking, such as SSC and SCC under certain conditions at the top of the line or the bottom of the line (e.g., conditions mimic wet natural gas pipelines).

The measurements from the present system can then allow for precise prediction and assessment of materials and chemical performance prior to application in real-world environments. The "chemical performance" generally refers to the performance of corrosion inhibitors, which can be employed for top of the line corrosion mitigation. As the system is configured for top of the line corrosion measurements, the performance of corrosion inhibitors and corrosion resistance of different materials or alloys can be examined under conditions relevant to the top of the pipeline. For measuring performance of corrosion inhibitors, this can be achieved by evaluating the corrosion resistance in their presence and absence. It should be noted that the chemical performance can also be assessed in the presence of various materials or alloys as part of the sample substrate when it is simulating the top of the line portion of the pipeline as well as embodiments in which the substrate is immersed in solution (liquid phase).

The system of the present application takes into consideration the curvature of the pipeline, as well as the vapor condensation rate and liquid droplet initiation and formation. These considerations allow the present system to better simulate top-of-line corrosion environments.

Finally, the present system utilizes multiple system components to mimic top-of-the-line corrosion environments, including the addition of a gas mixture of interest, mimicking gas and liquid temperatures in a pipeline, inducing controlled vapor condensation (specifically in the top portion of the system) on the curved substrate, and causing a temperature gradient between the gas phase and the corroding substrate.

It is to be understood that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Notably, the figures and examples above are not meant to limit the scope of the present disclosure to a single implementation, as other implementations are possible by way of interchange of some or all the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings according to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:
1. A system for simulating top-of-line corrosion, the system comprising:

an autoclave chamber comprising a liquid phase and a gas phase that simulate the conditions of a wet gas pipeline, wherein the gas phase comprises $H_2S$ and $CO_2$;

a sample substrate having a curvature that mimics the size and shape of the top of a pipeline of interest, wherein the sample substrate is arc-shaped and wherein the sample substrate is located in the gas phase of the autoclave chamber;

a sample holder configured to apply variable stress to ends of the sample substrate;

a cooler located on an upper portion of the autoclave, wherein the cooler is configured to cool the sample substrate;

a heating element operatively connected to a lower portion of the autoclave chamber and configured to heat the liquid phase;

a condensation collector located beneath at a least a portion of the sample substrate within the autoclave chamber and configured to collect condensate from the sample substrate;

a pH meter operatively connected to the condensation collector and configured to measure a pH of the collected condensate;

an electrical resistance probe connected to the sample substrate; and an electrochemical probe in contact with the liquid phase, wherein the electrical resistance and electrochemical probes are configured to measure a corrosion rate on the surface of the respective probes.

2. The system of claim 1, further comprising:

a counter electrode, a reference electrode, and a potentiostat operatively connected to the electrochemical probe and the counter electrode.

3. The system of claim 1, further comprising a data logger operatively connected to the electrical resistance probe.

4. The system of claim 1, wherein the condensation collector comprises a wall having at least one side perforation configured to control the level of condensate in the condensation collector.

5. The system of claim 1, wherein variable stress is applied by the sample holder via at least one screw applied to each end of the sample substrate.

6. The system of claim 5, wherein the variable stress applied is up to approximately 500 MPa.

7. The system of claim 1, further comprising a first thermocouple configured to measure a temperature of the sample substrate, a second thermocouple configured to measure a temperature of the gas phase, and a third thermocouple configured to measure a temperature of the liquid phase.

8. The system of claim 1, wherein the system simultaneously simulates top-of-line corrosion and bottom-of-line corrosion.

9. The system of claim 1, further comprising a gas inlet and gas outlet, wherein the gas inlet and gas outlet are configured to transport acid gases in and out of the system, respectively.

10. The system of claim 1, further comprising a solution stirrer.

11. The system of claim 1, wherein the heating element is a heating jacket surrounding the lower portion of the autoclave chamber.

12. The system of claim 1, wherein the heating element is configured to heat the lower portion of the autoclave chamber at a temperature in the range of approximately 0° C. to approximately 200° C.

13. The system of claim 1, wherein the cooler maintains a temperature of the sample substrate in a range of approximately −10° C. to approximately 50° C.

14. The system of claim 1, wherein the autoclave chamber is operated at a pressure of up to approximately 5000 psi and at a temperature in the range of approximately 0° C.-200° C.

15. The system of claim 1, wherein the condensation collector is further configured to measure the water condensation rate.

16. A system for simulating top-of-line corrosion, the system comprising:

an autoclave chamber comprising a liquid phase and a gas phase that simulate the conditions of a wet gas pipeline;

an arc-shaped sample substrate having a curvature that mimics the size and shape of the top of a pipeline of interest;

a sample holder configured to apply variable stress to ends of the sample substrate;

a cooler located on an upper portion of the autoclave, wherein the cooler is configured to cool the sample substrate;

a heating element operatively connected to a lower portion of the autoclave chamber and configured to heat the liquid phase;

a condensation collector located beneath at a least a portion of the sample substrate within the autoclave chamber and configured to collect condensate from the sample substrate;

an electrical resistance probe connected to the sample substrate; and an electrochemical probe in contact with the liquid phase, wherein the electrical resistance and electrochemical probes are configured to measure a corrosion rate on the surface of the respective probes.

17. The system of claim 16, further comprising:

a counter electrode, a reference electrode, a potentiostat operatively connected to the electrochemical probe and the counter electrode, and a data logger operatively connected to the electrical resistance probe.

18. The system of claim 16, wherein the heating element is configured to heat the lower portion of the autoclave chamber at a temperature in the range of approximately 0° C. to approximately 200° C., and the cooler maintains a temperature of the sample substrate in a range of approximately −10° C. to approximately 50° C.

19. The system of claim 16, wherein the variable stress applied is up to approximately 500 MPa.

20. The system of claim 16, further comprising a gas inlet and gas outlet, wherein the gas inlet and gas outlet are configured to transport acid gases in and out of the system, respectively.

* * * * *